R. KROEDEL.
PHOTOGRAPHIC FILM CAMERA.
APPLICATION FILED JUNE 10, 1918.
1,314,523.
Patented Sept. 2, 1919.
2 SHEETS—SHEET 1.
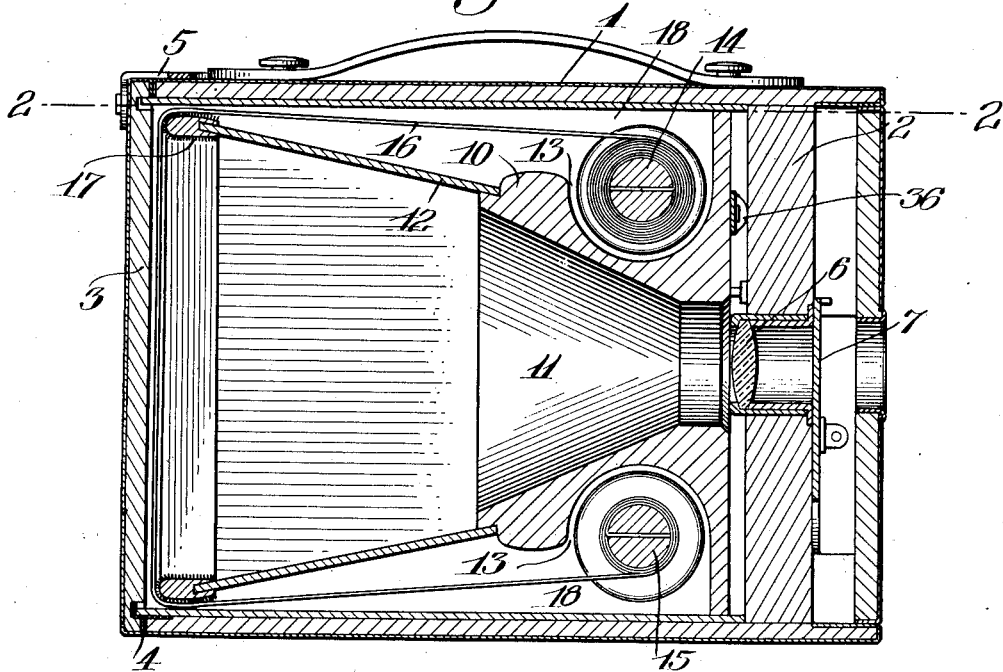
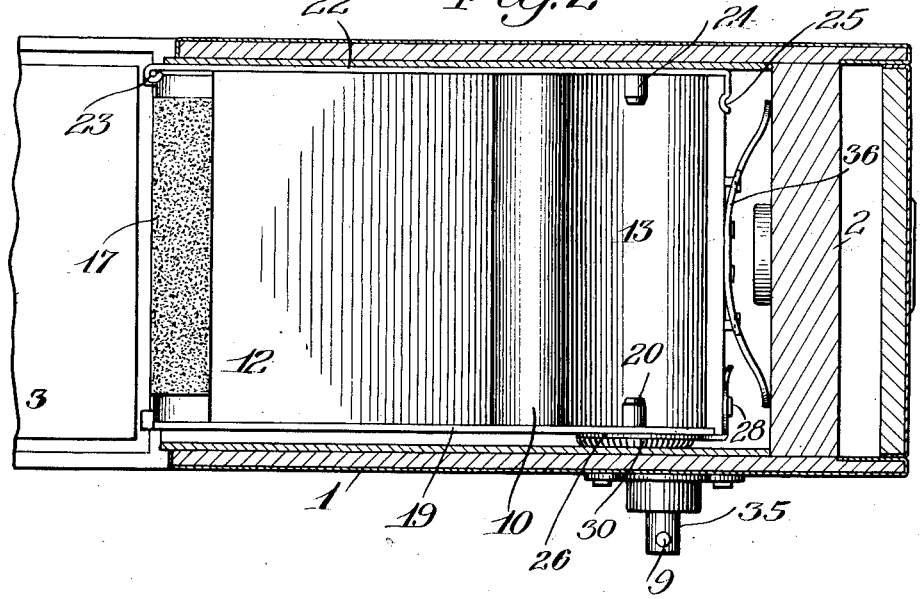
Witnesses:
INVENTOR
Robert Kroedel
BY
his ATTORNEYS

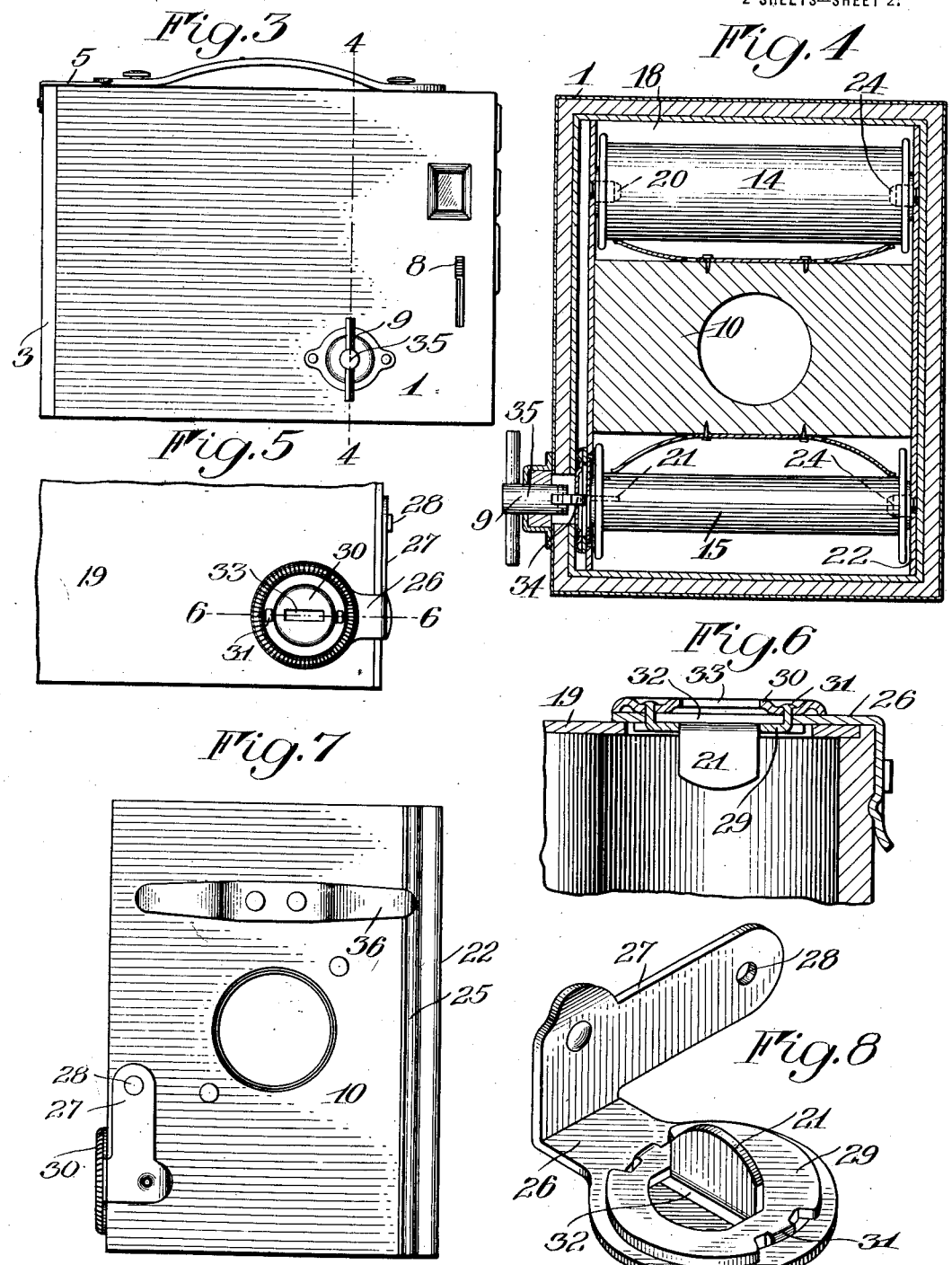

UNITED STATES PATENT OFFICE.

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-FILM CAMERA.

1,314,523.　　　　　Specification of Letters Patent.　　Patented Sept. 2, 1919.

Application filed June 10, 1918. Serial No. 239,089.

*To all whom it may concern:*

Be it known that I, ROBERT KROEDEL, of Rochester, in the county of Monroe and State of New York, have invented certain new and useful Improvements in Photographic-Film Cameras; and I do hereby declare the following to be a full, clear, and exact description of the same, reference being had to the accompanying drawings, forming a part of this specification, and to the reference-numerals marked thereon.

My present invention relates to photography and more particularly to photographic cameras or roll holders and it has for its object to provide a simple, cheap and serviceable roll holder for box cameras which will render more convenient the manipulation of the film rolls and the threading of the film through the camera. To these and other ends the invention resides in certain improvements and combinations of parts all as will be hereinafter more fully described, the novel features being pointed out in the claims at the end of the specification.

In the drawings:

Figure 1 is a central sectional view through a box camera constructed in accordance with and illustrating one embodiment of my invention, the same being assembled and ready for use;

Fig. 2 is a section taken substantially on the line 2—2 of Fig. 1 showing the manner in which the inner element or frame of the camera is withdrawn from the outer element or casing;

Fig. 3 is a side elevation of the camera on a reduced scale;

Fig. 4 is an enlarged section on the line 4—4 of Fig. 3;

Fig. 5 is a fragmentary elevation showing a detail of the winding mechanism;

Fig. 6 is an enlarged section on the line 6—6 of Fig. 5;

Fig. 7 is a front view of the inner frame, and

Fig. 8 is an enlarged perspective view of the film winding spool center.

Similar reference numerals throughout the several views indicate the same parts.

The outer case or body of the camera, in the present instance, comprises a shell 1 having a lens board partition 2 at the front and a door 3 at the back hinged at 4, as shown in Fig. 1, and secured in closed position by a suitable catch or catches 5. The partition 2 carries the lens 6 and, in front of it, the shutter 7 having an operating member 8, Fig. 3. Also shown in Figs. 2, 3 and 4 as being carried by the case, is the usual film winding key 9 which will be later referred to.

Slidably insertible in and removable from the case is an inner frame 10 having a cone-shaped light passage 11 in rear of the lens 6 and embodying an exposure chamber 12. On two of its opposite sides it is formed to provide roll holding cavities 13 for the feed spool 14 and the winding spool 15 from the former of which the film 16 is carried over a plush track 17 at the rear of the exposure opening 12 and onto the latter. The frame therefore forms film chambers 18 in conjunction with the adjacent walls of the outer case which coöperate with it in a light-tight manner.

One end of the film chambers is provided by a fixed wall 19 of the inner frame which wall carries a fixed spool center 20 for one of the rolls and a winding center 21 for the other roll, as will be hereinafter described. The other ends of the film chambers are constituted by a movable wall 22 hinged at the rear of the frame as shown at 23 in Fig. 2 and carried on said wall are two centers 24 for the two chambers. To load the camera, the inner frame 10 is withdrawn from the case 1 permitting the wall 22 to be raised on its hinge 23 and carry the centers 24 in an endwise direction away from the holders 13. The spools 14 and 15 are then inserted in the holders on the centers 20 and 21 and subsequently engaged and locked in place by the centers 24 as the wall 22 is swung back into position again. When the frame is reinserted in the case, the assembly of these two parts maintains the two sets of centers in the engaged relationship. A suitable locking flange or other device 25 may be provided on free or swinging edge of the wall 22 to coöperate with the forward portion of the frame 10 and yieldably maintain the wall 22 in operative position.

During the preliminary threading of the film through the camera from spool to spool, it is convenient to have a means, then accessible, for turning the winding roll 15. I provide this in connection with the winding center 21 which is mounted in the present instance, upon the offset 26 of a swinging bracket arm 27 pivoted at 28 to the front of the inner frame 10 so that the center may be moved in an endwise direction toward and from the spool 14 and engaged within the usual end slot thereof. The said center 21 consists of an ear on a disk 29 that is rotatably mounted on the offset 26 and has a bearing against the inner face thereof while a disk 30 bearing against the outer face is secured to the disk 29 by ears 31 on the latter. The offset arm 26 has a central opening 32 in which the ears 31 turn and alined with this opening and with the center 21 is a slot 33 in the outer disk 30. The latter is knurled at its edges as clearly indicated in Fig. 5, and serves as a finger-piece for preliminarily turning the center 21 and the film spool 14 when the frame 10 is withdrawn from the case 1 to assist in initially threading the film, as stated, but being very flat, it does not interfere with sliding the frame 10 within the case 1, as shown in Fig. 2. When the frame and case are assembled, the outside or main film winding key 9 is engaged, by means of a flat head 34 at its inner end with the slot 33 in the finger-piece disk 30 and in this way, the center 21 interlocked with the spool, is rotated from the exterior of the camera, as usual, to wind the film between exposures. The stem 35 of the winding key 9 has the usual axial as well as rotative movement, permitting it to be engaged or disengaged from the inner finger-piece disk 30 at will and when engaged, it serves to lock the frame 10 within the case 1.

To assist the operator in withdrawing the inner frame 10 from the case, a double leaf spring 36 is carried on the front of the frame 10 which engages the rear face of the partition 2 of the case, as shown in Fig. 2. This spring is under compression when the back or door 3 of the case is closed and the winding key 9 is engaged with the finger-piece 30, locking the frame within the case. When the door 3 is opened, however, and the winding key 9 withdrawn, as in Fig. 2, this spring 36 projects the frame 10 from the case slightly and makes it easier for the operator to withdraw it. The spring 36 also operates when the parts are assembled as in Fig. 1, to hold the frame snugly within the case and prevent relative movement or rattling of the two elements.

I claim as my invention:

1. In a camera, the combination with an outer case, of an inner frame having roll holders at opposite sides thereof and removably contained within the case to form film chambers in conjunction therewith, said roll holders embodying a displaceable end wall on the frame adapted to be moved into and out of endwise contact with a spool in the holder when the frame is removed from the case.

2. In a camera, the combination with an outer case, of an inner frame having roll holders at opposite sides thereof and removably contained within the case to form film chambers in conjunction therewith, and an end wall for the film chambers hinged to the frame and held in operative position by the case when the frame is assembled therein, said end wall carrying spool centers adapted to swing therewith toward and from and endwise of spools in the holders when the frame is withdrawn from the case.

3. In a camera, the combination with a case, and a roll holder frame removably contained therein and embodying a spool chamber having a rotatable spool centering and winding device in an end wall thereof, of a finger-piece on an outer wall of the frame connected to afford means for turning the winding device while the frame is withdrawn from the case and a winding key on the exterior of the latter interlocking with and adapted to turn the finger-piece when the frame is assembled within the case.

ROBERT KROEDEL.